United States Patent [19]

Raycher

[11] Patent Number: 5,252,802
[45] Date of Patent: Oct. 12, 1993

[54] APPARATUS FOR WELDING A STUD TO A WORKPIECE
[75] Inventor: Robert J. Raycher, Amherst, Ohio
[73] Assignee: TRW Inc., Lyndhurst, Ohio
[21] Appl. No.: 9,864
[22] Filed: Jan. 27, 1993
[51] Int. Cl.$^5$ .............................................. B23K 9/20
[52] U.S. Cl. .................................................. 219/98
[58] Field of Search ................................. 219/98, 99
[56] References Cited
U.S. PATENT DOCUMENTS
5,030,815  7/1991  Glorioso .
5,070,226 12/1991 Raycher et al. .

*Primary Examiner*—Clifford C. Shaw
*Attorney, Agent, or Firm*—Tarolli, Sundheim & Covell

[57] ABSTRACT

Apparatus is presented herein for controlling a stud welding gun for welding a stud to a workpiece. The stud welding gun has a gun body and a gun shaft mounted to the body in such a manner to permit reciprocal movement of the shaft relative to the body. The shaft has a distal end having means for carrying a stud to be welded to the workpiece. A linear motor is carried by the gun for directly driving the shaft in forward and reverse directions between fully extended and fully retracted positions relative to the gun body. A floating point detector provides a control signal when the stud engages the workpiece as the shaft is being driven in a forward direction to establish a reference position of the gun body relative to the workpiece. A control responds to the floating point signal for controlling the motor for driving the shaft in the reverse direction to a retracted lift position away from the workpiece and in the forward plunging direction to a plunge position causing the stud to engage the workpiece to achieve welding.

13 Claims, 2 Drawing Sheets

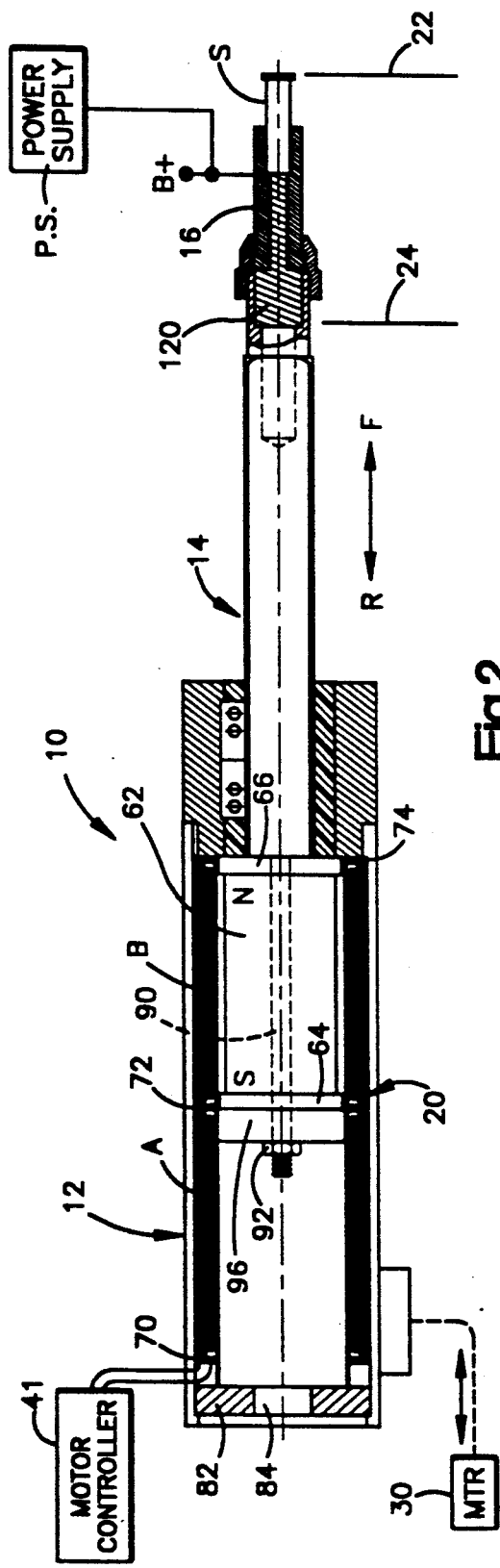
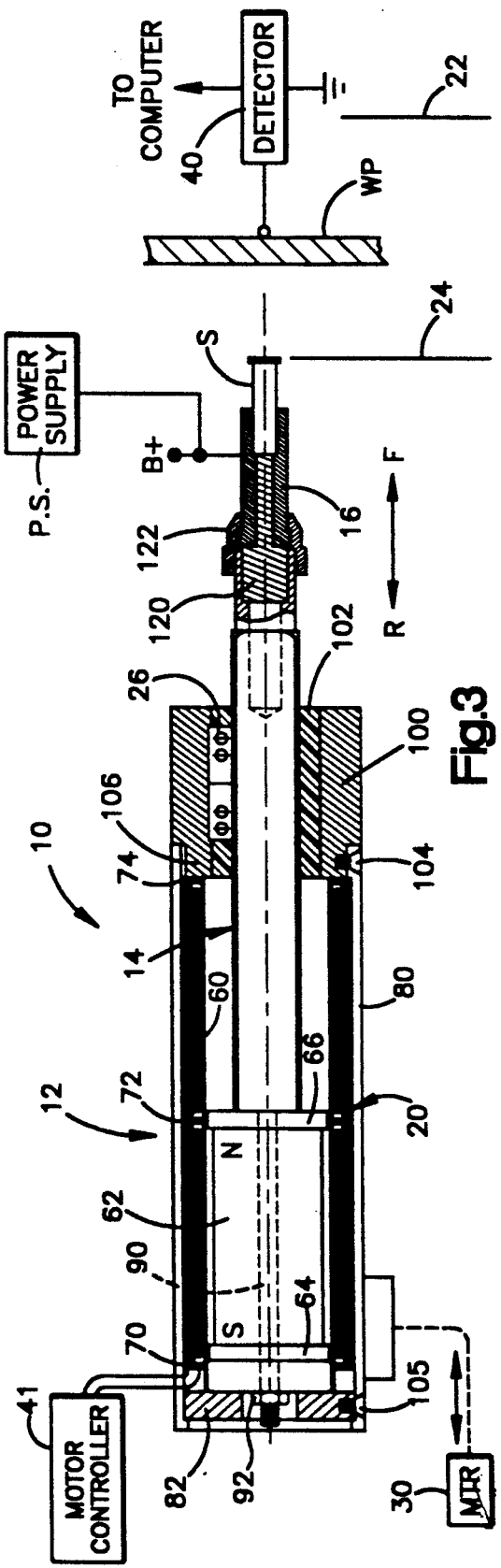

APPARATUS FOR WELDING A STUD TO A WORKPIECE

BACKGROUND OF THE INVENTION

1. Technical Field

The present invention is directed to the art of welding a stud to a workpiece and, more particularly, to improvements in a stud welding gun.

2. Prior Art

A typical stud welding system includes a power supply, control circuitry and a stud welding gun. Such a welding gun includes a gun body and a gun shaft. The shaft is mounted to the gun body for reciprocal movement with respect thereto between fully extended and fully retracted positions. The gun shaft has a distal end having means, such as a chuck, for carrying a stud to be welded to a workpiece. Typically, the gun is a hand held device and includes a member known as a foot which is fixed to and extends forwardly of the gun body and is placed up against a workpiece to which a stud is to be welded. Thereafter, the operator actuates a trigger which energizes an electric solenoid which causes the shaft to be retracted to a lift position while appropriate circuitry supplies welding current to the shaft and the stud. After an arc has been established, the control circuitry deactuates the solenoid and the shaft is driven by a spring so as to plunge toward and cause the stud to engage the workpiece, at which time welding therebetween takes place. An apparatus for accomplishing the foregoing is disclosed in the U.S. Pat. No. 5,030,815 to P. A. Glorioso.

In my previous U.S. Pat. No. 5,070,226 there is disclosed a stud welding gun similar to that as described above but which does not employ a solenoid for lifting the gun shaft and a spring for, upon de-energization of the solenoid, causing the shaft to plunge toward the workpiece. Instead, that patent discloses a gun employing a rotary stepper motor interconnected between the gun body and the gun shaft. The motor has an associated rotary to linear converter which serves to drive the gun shaft relative to the gun body in forward and reverse directions. Thus, the shaft may be driven in a reverse direction to a lift position and thereafter driven in a forward or plunge direction to cause a stud to engage a workpiece to achieve a weld therebetween.

The prior art typically employs a foot on a hand held welding gun to assist in initially positioning the gun relative to a workpiece prior to commencing a welding cycle. If such a foot is not employed, as in an automatic welding machine system, difficulties may arise in initializing the system prior to a welding cycle. That is, a starting or reference position of the welding gun relative to the workpiece may be needed.

Moreover, the prior art described above does not provide for a linear motor for directly driving the gun shaft in forward and reverse directions. Instead, the welding gun disclosed in my aforesaid patent discloses a rotary to linear converter in conjunction with a rotary stepper motor for driving the shaft in forward and reverse directions.

SUMMARY OF THE INVENTION

The invention contemplates the provision of apparatus for welding a stud to a workpiece which employs a stud welding gun having a gun body, where a gun shaft is mounted to the body in such a manner to permit reciprocal movement of the shaft relative to the body. The shaft has a distal end that has means for carrying a stud.

It has been determined that a linear motor for directly driving the gun shaft in forward and reverse directions can achieve higher speed and longer life than a rotary stepper motor.

Consequently, in accordance with one aspect of the present invention, the gun incorporates a linear motor for directly driving the shaft in forward and reverse directions between respective fully extended and fully retracted positions relative to the gun body. A controller serves to control the linear motor for driving the shaft in a reverse direction to a retracted lift position spaced away from the workpiece and then in a forward plunging direction to a plunge position causing the stud to engage the workpiece to achieve welding therebetween.

In accordance with another aspect of the present invention, a floating point detector provides a floating point signal when the stud engages the workpiece as the shaft is being driven in a forward direction to thereby define a reference position of the gun body relative to the workpiece. A controller responds to the floating point signal for controlling the motor for driving the shaft to a retracted lift position away from the workpiece and then driving the shaft in a forward plunging direction to a plunge position during which the stud is caused to engage the workpiece to achieve welding therebetween.

BRIEF DESCRIPTION OF THE DRAWINGS

The foregoing and other features and advantages of the present invention will become more apparent to those skilled in the art, to which the present invention relates, from a reading of the following description of a preferred embodiment with reference to the accompanying drawings, in which:

FIG. 2 is a longitudinal cross-sectional view of a welding gun showing the welding gun shaft in its extended position;

FIG. 3 is a view similar to that of FIG. 2 but showing the welding gun shaft in its retracted position;

DETAILED DESCRIPTION OF A PREFERRED EMBODIMENT

Figure 1:
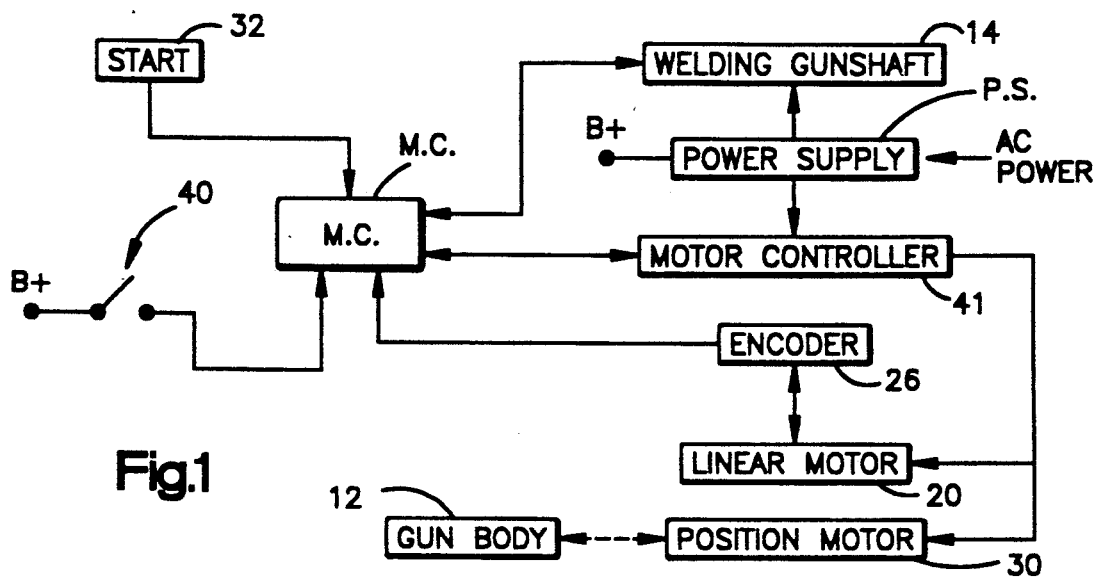
FIG. 1 is a schematic-block diagram illustration of a control circuit, in accordance with the present invention, for use with the welding gun shown in FIGS. 2 and 3.

Reference is now made to FIGS. 1, 2 and 3 which illustrate apparatus for welding a stud S to a workpiece WP (see FIG. 3) and which employs a stud welding gun 10 having a gun body 12 and a gun shaft 14 mounted to the body in such a manner to permit reciprocal movement of the shaft relative to the body. The shaft 14 has a distal end which carries a chuck 16, of conventional design, which, in turn, is adapted to carry stud S. As is conventional, the chuck 16, in cross section, includes a coaxial array of spaced apart fingers which are designed to resiliently bear against and hold the stud S in place at the distal end of the shaft. Also, as is conventional in the art, the chuck 16 is in electrical connection with the shaft 14 to a suitable power supply PS which, under control of a microcomputer MC, supplies a pilot arc current and then a main current to the shaft and, thence, to the stud S to achieve welding, in a known manner.

A linear motor 20 is carried by the gun 10 and serves to directly drive the shaft 14 in forward F and reverse R directions between a fully extended position 22 and a fully retracted position 24 relative to the gun body. These positions are shown in FIGS. 2 and 3. The linear motor 20 will be described in greater detail hereinafter.

An encoder 26 is associated with the motor 20 and serves to provide a position signal representative of the position of shaft 14 relative to the body 12 during operation of the linear motor. This position signal is communicated to the microcomputer MC for use in controlling the operation of the motor. As will be described in greater detail hereinafter, the microcomputer, under program control, operates to drive the motor to a retracted lift position away from the workpiece during which a pilot arc current and then a main current are applied to the chuck 16. Thereafter, the motor is operated to drive the stud in a forward plunging direction to a plunge position during which the stud engages the workpiece to achieve a weld therewith.

Having briefly presented an overview of the invention, attention is directed to FIGS. 1–5 in conjunction with the following more detailed description of the preferred embodiment of the invention. Initially, the stud welding gun 10 is positioned so that its distal end, with the stud S in place, is located close to the workpiece WP. The distance between the stud S and the workpiece should be within the range of the forward movement of the shaft 14 from its fully retracted position 24 to its fully extended position 22. This may be achieved by operating a position motor 30 which is mechanically connected to the gun body 12 for driving the gun body in forward or reverse directions relative to the workpiece. The operator may directly operate the position motor 30 or the operator may actuate a suitable start control 32 which actuates the microcomputer MC and which, in turn, operates the position motor 30 by way of a suitable motor control circuit 41. This will cause the position motor to drive the gun body 12 in a direction so that the stud S is positioned proximate to (but not contacting) the workpiece WP. Alternatively, the workpiece WP may be moved relative to the gun body. Also, the gun may be hand held and positioned by hand relative to the workpiece.

At this point, the operator may supply an input, as by the start control 32, to the microcomputer indicating that a weld operation may commence. Before a weld cycle takes place, the microcomputer will, under program operation, operate the motor 20 commencing at time T1 (see FIG. 4) to drive shaft 14 in a forward direction in order to locate the position of the workpiece WP relative to the gun body 12. As the shaft 14 is driven in a forward direction, its position relative to the gun body is communicated to the microcomputer by way of the encoder 26. The speed of shaft movement may be on the order of 5 inches per second. When the stud S makes engagement with the workpiece WP at time T2 (see FIG. 4), the location of the workpiece relative to the gun body is known to the microcomputer. The point in time that the stud engages the workpiece (time T2 in FIG. 4) is detected by a floating point detector 40 which provides a floating point signal to the microcomputer. In FIG. 1, the detector 40 is characterized as being a simple normally open switch which, upon closure, connects a B+ voltage to the microcomputer to indicate that the stud is in contact with the workpiece. In FIG. 3, the B+ voltage source is shown as being electrically connected to the chuck 16 which, in turn, is in electrical communication with the stud S. Once the stud engages the metal workpiece WP, a circuit is completed at time T2 (see FIG. 4) between the B+ voltage supply source and the detector 40 so that the floating point signal may be transmitted to the microcomputer MC. Detector 40 may include an optical coupler.

With the floating point established, the microcomputer MC is now conditioned to commence a weld cycle WC. During each weld cycle WC, the microcomputer MC, under program control, initiates a hold period from time T2 to time T3 during which a pilot current is applied. No arc is established at this point. The duration of the interval from time T2 to time T3 may be on the order to 10 milliseconds, for example.

Figure 4:
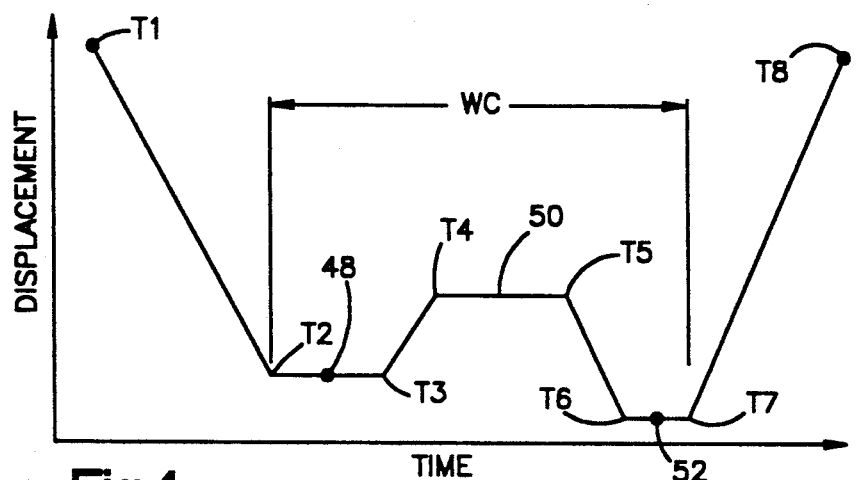
FIG. 4 is a graphical illustration showing stud position with respect to time and which is useful in describing the operation of the invention.

At time T3, the computer initiates a lift operation during which the stud is lifted in a reverse direction away from the workpiece WP to a lift position 50 (see FIG. 4). The lift position 50 is a known distance from the hold position 48 and this is programmed into the microcomputer. The speed of movement from time T3 to time T4 is not critical but should be sufficiently fast to minimize the time between weld cycles. During this lift period, the gap between the stud and the workpiece increases and the pilot current is sufficient to establish and maintain a pilot arc. The time duration of the lift period from time T3 to time T4 may be on the order of 8 to 10 milliseconds, for example.

When the stud has been retracted to the lift position 50, it is held there for a time period which, for example, may be on the order of 20 milliseconds. During this time, the computer is programmed to apply the main welding current to the stud to strengthen the arc and thus establish the main arc. At the completion of the lift period at time T5, the computer initiates a plunge stroke by activating the motor 20 so that the motor is driven in a forward plunging direction causing the stud to plunge toward and engage the workpiece WP. The plunge stroke extends from time T5 to time T6. At time T6, the stud has arrived at the final plunge position 52. The final plunge position is maintained from time T6 to time T7 which is sufficient time for the weld to solidify. This period may be on the order of 5 milliseconds, for example. The plunge velocity is controlled by the computer so that the weld current is turned off at the point in time that the stud makes engagement with the workpiece. At time T7, the computer controls the motor 20 to drive the chuck to its fully retracted position 24 (see FIG. 3) which takes place at time T8. The stud is now welded to the workpiece and pulls out of the chuck as the chuck retracts. A new stud is now loaded into the chuck 16 either manually or automatically through equipment not shown. The welding gun is now in condition to commence another cycle of operation.

Figure 5:
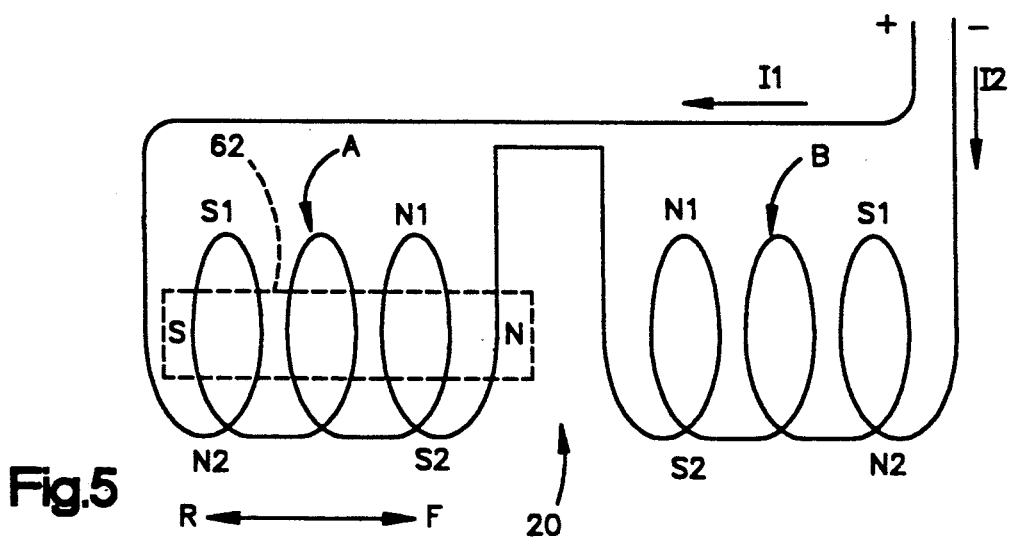
FIG. 5 is a schematic illustration of the linear motor employed herein.

As shown in FIG. 2, 3 and 5, the linear motor 20 includes coils A and B which are connected together in series but are reverse wound relative to each other so that their respective magnetic end poles are reversed (as will be discussed in greater detail hereinafter). The two coils are wrapped about an elongated cylindrical bobbin 60 which coaxially surrounds and slidably receives a piston shaped permanent magnet 62. The bobbin is constructed of non-magnetic material, such as anodized aluminum, to isolate the coil from the magnet, both electrically and magnetically. The permanent magnet may, for example, have a south pole S at its left end and a north pole N at its right end, as indicated by the markings in FIGS. 2 and 3. The magnet has a pair of end pieces or disks 64 and 66 having diameters slightly greater than the rest of the magnet. Disks 64 and 66 are constructed of mild ferromagnetic, low carbon (soft) steel. However, the diameters of these end pieces are sufficiently less than the inner diameter of the bobbin 60 that the magnet is slidably received so that it may reciprocate along its axis in forward (right) and reverse (left) directions. The bobbin 60 is provided with radially extending flanges or dividers 70, 72 and 74 which serve to provide areas for receiving coils A and B while keeping the coils separated from each other during the operation. The coils A and B are surrounded by an outer casing or housing 80, which may take the form of an elongated tubular steel casing. The housing 80 is constructed of mild ferromagnetic, low carbon (soft) steel. At its left end, as viewed in FIGS. 2 and 3, the steel casing is provided with a disk-shaped cap or end plate 82 having a central bore 84 therein for receiving a portion of the proximal end of shaft 14 when the shaft is retracted to its fully retracted position, as shown in FIG. 3. The end plate 82 is constructed of non-magnetic material, such as aluminum.

The shaft 14 is constructed of non-magnetic material, such as stainless steel or aluminum. At its proximal end, the shaft has a reduced diameter portion 90 which extends through a suitable bore in the permanent magnet. The proximal end of shaft portion 90 is threaded and receives a nut 92 to secure the shaft 14 to the magnet 62 while keeping end plates 64 and 66 in place.

As shown in FIGS. 2 and 3, a disk-shaped bearing plate 96 is interposed between nut 92 and end piece 64. Bearing plate 96 is constructed of non-magnetic material, such as aluminum or plastic. This bearing plate 96 has an outer diameter just slightly less than that of the inner diameter of the bobbin 60 and provides a bearing surface for engaging the inner surface of the bobbin during reciprocal movement of the permanent magnet.

The end plate 82 serves as a stop to prevent further reverse movement of the magnet when the end plate is struck by the bearing plate 96. On the right side of the housing 80, there is provided an annular sleeve 100 which coaxially surrounds the shaft 14. Sleeve 100 is constructed of non-magnetic material, such as aluminum. This sleeve receives an annular front bearing 102 which coaxially surrounds and slidably receives the shaft 14 during its reciprocal movement between fully extended and fully retracted positions. Bearing 102 is constructed of non-magnetic material, such as plastic. The sleeve 100 is necked in somewhat and secured to housing 80 by means of a screw 104. A similar screw 105 secures the end piece 82 to the housing 80. The left end 106 of sleeve 100 serves as a stop to prevent further forward movement of the permanent magnet when end plate 66 engages the left end 106 of the sleeve.

A slot is provided in bearing 102 to receive a stationary portion of the encoder 26 (see also FIG. 1). This encoder serves to provide a position signal indicating the position of the shaft 14 relative to the gun body 12 while the shaft is displaced between its fully retracted position as shown in FIG. 3 and its fully extended position as shown in FIG. 2. This encoder may take the form of a potentiometer such as that provided in my previous U.S. Pat. No. 5,070,226. Preferably, the encoder takes the form of a relative movement optical encoder wherein the stationary portion as viewed in FIGS. 2 and 3 includes optical transmitter means, such as light emitting diodes, and optical receiver means, such as photo transistors. In such case, light may be reflected off markings on the shaft. Alternatively, the shaft may carry an encoder card having suitable optical markings thereon. Such an encoder will provide position and direction of movement information to inform the microcomputer MC the position of the shaft relative to the gun body as its moves in forward and reverse directions.

At its distal end, the shaft 14 has a bore which carries a stop 120 against which the chuck 16 abuts. The chuck 16 is held in place by means of a nut 122 which surrounds the chuck 16 and is provided with internal threads to make threaded engagement with external thread on shaft 14.

Attention is now directed to FIG. 5 which presents a schematic illustration of the linear motor 20 showing the permanent magnet 62 in dotted lines in its fully retracted position (see FIG. 3). As noted hereinbefore, the coils A and B are connected together in series but are reverse wound relative to each other so that their magnetic poles are reversed. Thus, if current I1 is caused to flow in the direction as indicated in FIG. 5, then this current will flow through the series connected coils causing coil A to have a south pole and a north pole with the south pole being at the left as designated S1 and the north pole being at the right end of the coil and designated N1. Similarly, as the current flows through coil B, it will have a magnetic field such that the left end may be a north pole, designated N1, and the right end of the coil may be a south pole, designated S1.

Initially, with the permanent magnet 62 having its south pole S aligned with the south pole S1 of the coil A, the permanent magnet will be repelled by the south pole of the coil. The magnet is prevented from moving to the left because of its engagement with end piece 82. This repelling force will cause the magnet to move toward the right in a forward direction F. As the permanent magnet continues to move in the forward direction F, the south pole S1 of coil B will attract the north pole N of the magnet. Also, the north pole N1 of coil B will attract the south pole S of the magnet, causing the permanent magnet to continue to move toward the right in a forward direction F. This forward movement will continue until the magnet is brought to a halt by the end pole piece 66 on the magnet striking the left end 106 of the sleeve 100. At this point, the permanent magnet will be moved all the way to the right in FIG. 5 so that the north pole N of the magnet is aligned with the right end of coil B and the south pole of the magnet is aligned with the left end of coil B. At this point, the computer reverses the flow of current so that current I2 flows in the opposite direction through the coils A and B in the direction as indicated in FIG. 5. This causes coils A and B to have their magnetic end poles reversed as indicated by designations N2 and S2 just below the coils in FIG. 5. Consequently, as current I2 flows through the coils in the direction as noted, the north pole N of the permanent magnet 62 is repelled by the north pole N2 of coil B and the permanent magnet moves to the left as viewed in FIG. 5 in the reverse direction R. As the permanent magnet gets about one-half of the distance to the coil, the north pole N2 of coil A will attract the south pole S of the permanent magnet 62 causing the permanent magnet to continue to move toward the left in the reverse direction R and this movement will continue until bearing 96 on the left end of the magnet strikes the end piece 82 (which acts as a stop) of the housing.

In the above discussion, movement of the permanent magnet in either the forward direction F or the reverse direction R was terminated by the magnet engaging a stop provided at one end of the gun housing. The magnet may, however, be stopped at a location intermediate the fully extended and fully retracted positions represented by the stops. Thus, with reference to FIG. 4, the computer at time T3 commands the welding gun to retract the shaft so that it is retracted to a lift position 50 from the hold position 48. This retraction is a known distance which has been programmed in the computer. Consequently, when the computer commands the linear motor to move the shaft 14 in a reverse direction, current I2 (FIG. 5) will be applied to coils A and B. Since the lift position 50 is known to the computer, the position signal obtained from the encoder 26 is monitored to find the location of the permanent magnet which corresponds to the programmed distance from the hold position 48 to the lift position 50. At that point, the permanent magnet is stopped by reversing the current flow from I2 to I1 and monitoring the position sensed by encoder 26. Some hunting may take place in the event that the magnet overshoots the intended lift position 50. Consequently, as the computer controls the welding gun during the welding cycle WC from time T2 through T7, the computer will monitor the position sensed by the encoder 26 to control the positioning of the gun shaft to correspond with the lift position 50 and then the plunge position 52 before commanding the gun shaft to return to its retracted position at time T8 at which the reverse movement of the permanent magnet will be stopped by the magnet engaging end piece 82.

Although the invention has been described in conjunction with a preferred embodiment, it is to be appreciated that various modifications may be made without departing from the spirit and scope of the invention as defined by the append claims.

Having described the invention, the following is claimed:

1. Apparatus for welding a stud to a workpiece, comprising:
    a stud welding gun having a gun body and a gun shaft mounted to said body so as to permit reciprocal movement of said shaft relative to said body, said shaft having a distal end having means for carrying said stud;
    linear motor means carried by said gun for directly driving said shaft in forward and reverse directions between respective fully extended and fully retracted positions relative to said gun body; and
    control means for controlling said linear motor means for driving said shaft in a reverse direction to a retracted lift position away from said workpiece and in a forward plunging direction to a plunge position causing said stud to engage said workpiece.

2. Apparatus as set forth in claim 1 including position sensing means for sensing the position of said gun shaft relative to said gun body and providing a position signal representative of said position.

3. Apparatus as set forth in claim 2 wherein said control means is responsive to said position signal for controlling said linear motor means.

4. Apparatus as set forth in claim 1 including floating point detector means for providing a floating point signal when said stud engages said workpiece as said shaft is being driven in a forward direction to thereby establish a reference position of said gun body relative to said workpiece.

5. Apparatus as set forth in claim 4 including position sensor means for sensing the position of said gun shaft relative to said gun body and providing a position signal representative of said position.

6. Apparatus as set forth in claim 5 wherein said control means is responsive to said floating point signal and to said position signal for controlling said motor means.

7. Apparatus as set forth in claim 1 wherein said linear motor means includes a movable member coupled to said shaft for movement therewith and a stationary member coupled to said gun body and wherein one of said members includes a permanent magnet and the other of said member includes an elongated coil coaxially surrounding said magnet.

8. Apparatus as set forth in claim 7 including circuit means for interconnecting said coil means with said control means for controlling current flow through said coil in first and second directions to achieve movement of said shaft in said respective forward and reverse directions.

9. Apparatus as set forth in claim 8 wherein said movable member includes said permanent magnet and wherein said stationary member includes said coil.

10. Apparatus for welding a stud to a workpiece, comprising:
    a stud welding gun having a gun body and a gun shaft mounted to said body so as to permit reciprocal movement of said shaft relative to said body, said shaft having a distal end having means for carrying said stud;
    motor means carried by said gun for driving said shaft in forward and reverse directions through a range of positions between respective fully extended and fully retracted positions relative to said gun body;
    floating point detector means for providing a floating point signal when said stud engages said workpiece as said shaft is being driven in a forward direction to thereby establish a reference position of said gun body relative to said workpiece; and
    control means responsive to said floating point signal for controlling said motor means for driving said shaft in a reverse direction to a retracted lift position away from said workpiece and then driving said shaft in a forward plunging direction to a plunge position causing said stud to engage said workpiece.

11. Apparatus as set forth in claim 10 including second motor means for positioning said gun body to a location proximate to said workpiece with a said stud carried by said gun shaft spaced from said workpiece by a distance less than the distance between said fully retracted and fully extended positions of said gun shaft.

12. Apparatus as set forth in claim 10 including position sensing means for sensing the position of said gun shaft relative to said gun body and providing a position signal representative of said position and wherein said control means is responsive to said floating point signal and to said position signal for controlling said motor means.

13. Apparatus as set forth in claim 12 wherein said motor means carried by said gun includes linear motor means for directly driving said shaft.

* * * * *